United States Patent [19]

Pippert

[11] 4,379,558

[45] Apr. 12, 1983

[54] ANTI-EXTRUSION PACKING MEMBER

[75] Inventor: Fred B. Pippert, Houston, Tex.

[73] Assignee: Utex Industries, Inc., Houston, Tex.

[21] Appl. No.: 259,454

[22] Filed: May 1, 1981

[51] Int. Cl.³ ............................................. F16J 15/18
[52] U.S. Cl. ............................... 277/188 A; 277/164; 277/235 R
[58] Field of Search .............. 277/188 R, 188 A, 164, 277/227

[56] References Cited

U.S. PATENT DOCUMENTS

| | | | |
|---|---|---|---|
| 2,957,717 | 10/1960 | Bram | 277/164 |
| 3,820,799 | 6/1974 | Abbes et al. | 277/164 |
| 4,138,144 | 2/1979 | Pierce | 277/235 R |
| 4,190,258 | 2/1980 | Arai et al. | 277/164 |
| 4,310,163 | 1/1982 | Pippert | 277/188 A |

*Primary Examiner*—Robert I. Smith
*Attorney, Agent, or Firm*—Browning, Bushman, Zamecki & Anderson

[57] ABSTRACT

A seal or packing for use in dynamic or static applications subject to stretching, twisting or deforming forces, includes a body member forming the sealing and packing surfaces, together with an anti-extrusion reinforcing element incorporated in the body member. The anti-extrusion element is comprised of a helical round wire spring axially centered within a covering of an overlapping flat wire helical spring. The anti-extrusion elements are bounded or integrally joined to the body member at or near those locations thereon where extruding forces are likely to act.

6 Claims, 8 Drawing Figures

ANTI-EXTRUSION PACKING MEMBER

BACKGROUND OF THE INVENTION

The present invention relates to packing devices and, more particularly, to seals, packings and the like used in environments wherein at least a portion of the sealing device is subjected to extrusion forces.

Sealing devices, such as seals or packings, whether of the dynamic or static type, are usually made, or have portions made of materials which, to some extent, are resilient or at least deformable. In order to seal effectively, it is necessary that the sealing device be placed under some compressive loading between the components of the assembly to be sealed. Because of the compressing load and the deformable nature of at least a portion of the seal, and if the seal is subjected to sufficient pressure, there is a tendency for portions of the seal to be subjected to extrusion forces which will either distort the seal and impair its effectiveness as a seal or, in more severe cases, force portions of the seal into clearances between the components to be sealed.

In an attempt to overcome this extrusion problem, workers in the field have resorted to various techniques. One common practice employed to prevent such extrusion as, for example, in a seal ring or packing used between relatively reciprocating or rotating parts, is to mount separate back-up rings or washers adjacent the seal ring, the back-up ring serving to prevent the seal ring from being extruded. These back-up rings are generally made of metal or other hard materials which generally must be machined. Another technique which has been used is shown in U.S. Pat. No. 3,094,337 wherein there are disclosed anti-extrusion seal rings in which an annulus of a relatively soft sealing material is bonded to annular sections of anti-extrusion materials such as thermosetting resins or the like.

U.S. Pat. No. 4,219,204 shows anti-extrusion sealing devices having annular sections reinforced with a knitted material formed from interlocking filaments.

Another patent U.S. Pat. No. 3,719,366 shows an anti-extrusion packing having a reinforcing material comprised of a strip of fabric wound into a helix, with convoluting of the helix wound upon one another and bonded into integral sections.

Frisby et al. U.S. Pat. No. 2,446,224 shows an oil sealing ring having rings coiled upon one another with an offset that permits their contraction.

In some applications for packing devices it is necessary for the anti-extrusion element to elongate or stretch, or be twisted or otherwise altered in configuration. Although the standard oil spring or garter spring has been used as an anti-extrusion device in seals, it is found that the packing material has a tendency to extrude between adjacent coils of the spring when the packing is subjected to extreme pressures. Also, the garter spring, being made from a round wire, tends to leave impressions on metal surfaces that it contacts under pressure and may cause eventual seal failure.

It is therefore an object of the present invention to provide a new and improved anti-extrusion packing device that prevents extrusion of the packing material in its intended use and also which may be elongated or deformed without causing failure of the device or wear of sealed parts.

SUMMARY OF THE INVENTION

With these and other objects in view, the present invention contemplates a packing member having a generally deformable body portion with sealing surfaces thereon for sealing between parts. Contiguous and preferably bonded to the body portion is an anti-extrusion section or element formed from a tubular spring member such as a helical spring having flat wires with overlapping contiguous elements to form the tubular spring.

In another embodiment a second coiled spring is concentrically arranged within the tubular spring member to provide an anti-extrusion section which is particularly adapted to high pressure environments where elongation or deformation of the packing is likely.

DESCRIPTION OF THE PREFERRED EMBODIMENTS

Figure 1:
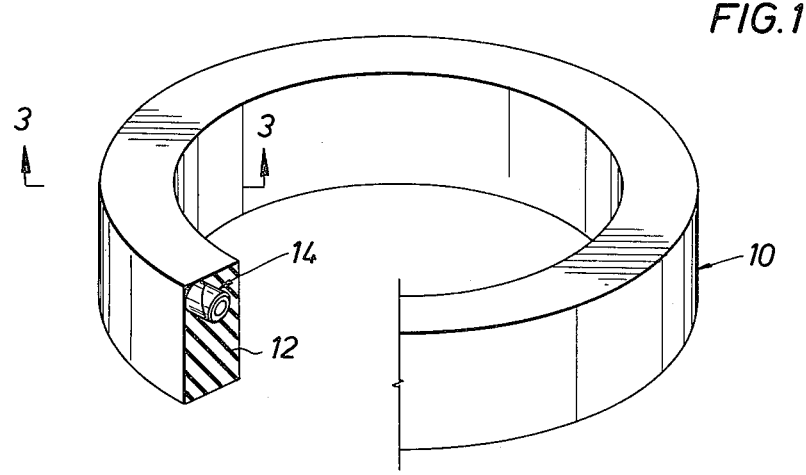
FIG. 1 is a perspective view of a packing member made in accordance with the present invention, a portion of the packing member being broken away for purposes of illustrating the presence of a spring type anti-extrusion section therein.
Figure 2:
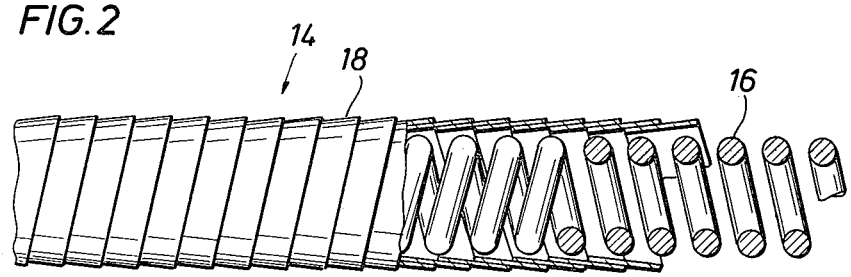
FIG. 2 is a detailed elevational view of the spring type anti-extrusion device with portions cut away to show details of its construction.
Figure 3:
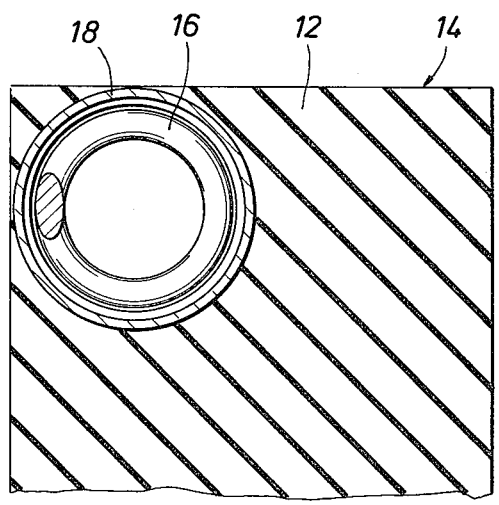
FIG. 3 is a cross sectional view of the packing member taken along lines 3—3 of FIG. 1.

Referring first to FIGS. 1, 2 and 3, there is a shown a typical squeeze packing 10 for use, generally, in a static application. The packing, which is generally square or rectangular in cross-section (See FIG. 3) is comprised of an annular, generally non-metallic body section 12, which, as shown, is generally homogeneous in nature, and can be formed of an elastomeric or resilient material such as a rubber. Squeeze packing 10 further includes an annular, anti-extrusion section or reinforcement ring 14 bonded to and defining a radially outer end corner of the packing 10. An anti-extrusion ring 14, is shown in greater detail in FIG. 2 as having an inner open helical coil spring 16 concentrically disposed within a helical flat wire spring 18 having overlapping contiguous elements forming a tubular encasement for the spring 16. The anti-extrusion ring 14, is bonded, or otherwise integrally joined to the material forming annular body 12.

Figure 4:
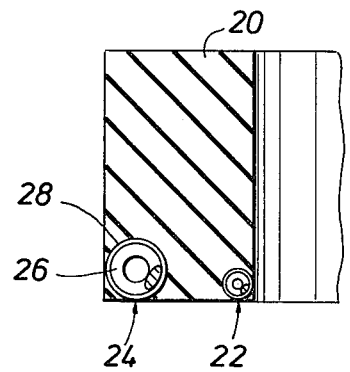
FIGS. 4-6 are cross sectional views of various packing devices made in accordance with the present invention.

Referring next to FIG. 4 of the drawings, there is shown a packing ring 20, in partial cross sectional view, having reinforcement rings 22 and 24 defining radially inner and outer corner portions respectively of the packing ring 20. The larger outer ring 24 has a first helical spring or garter spring 26 enclosed within a helical flat wire spring 28 with overlapping segments as shown in detail in FIG. 2. Inner reinforcement ring 22 is similarly constructed to ring 24 but of smaller component parts.

Figure 5:
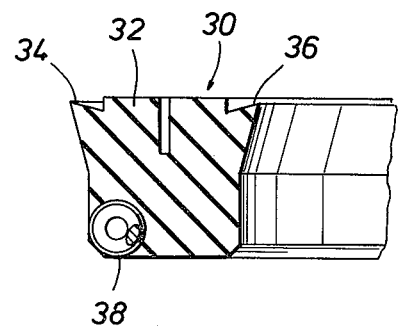

FIG. 5 shows a U-ring packing 30 constructed in accordance with the present invention, which would typically be used between a movable shaft and housing (not shown). The packing 30 is comprised of a homogeneous body portion 32 having outwardly flared sealing lips 34, 36 for contacting the shaft and housing respectively. A reinforcing ring 38 is arranged at one corner of the packing which constitutes an extrusion point in its intended usage. The extrusion ring is comprised of the concentric spring arrangement shown in detail in FIG. 2.

Figure 6:
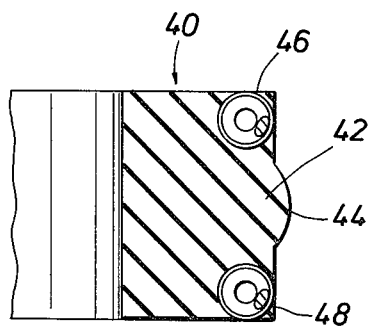

Referring next to FIG. 6, a D-ring seal 40 is shown, generally for use in static, rotating or reciprocating motion applications. The body portion 42 has a D-shaped annular projection 44 which is normally squeezed against a housing wall or the like. Upper and lower anti-extrusion reinforcement rings 46 and 48 respectively are positioned at the outer radial corners of the packing seal 40 to eliminate the tendency of the packing 40, under high pressure, to extrude into any clearance between the sealed parts whether they be static or relatively movable. The anti-extrusion rings 46 and 48 are constructed in accordance with the present invention, such as shown in FIG. 2.

It is noted that for low pressure applications, it may be unecessary to provide the inner helical spring 16 (FIG. 2). Thus the outer spring 18 with overlapping segments will suffice to provide reinforcing structure to the packing to prevent extrusion. Because of the enclosed nature of the outer spring 18, i.e., its structural integrity forming an enclosed tubular member, any tendency for the body portion to extrude between spring convolutions is prohibited. The outer spring 18 also is expandible to provide an expansible feature to the packing material in applications where longitudinal expansion, twisting, or other deformation of the packing material is likely.

Figures 7, 8:
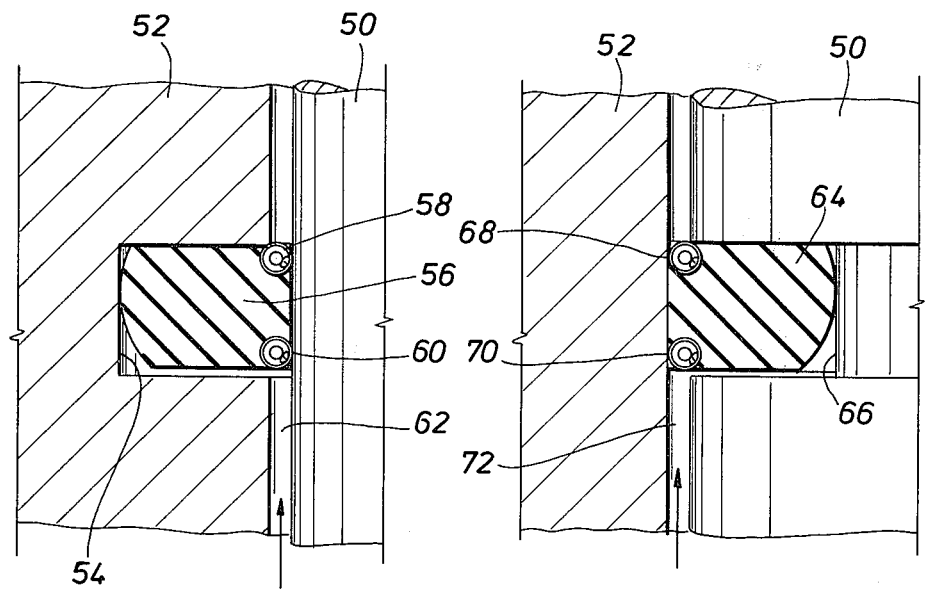
FIGS. 7 and 8 are environmental views, partly in section, showing packing devices made in accordance with the present invention and used to seal around a movable shaft.

FIGS. 7 and 8 show packing seals constructed in accordance with the present invention and used as a seal between a movable shaft 50 and a housing 52. FIG. 7 shows the packing 56 received within an annular recess 45 in the housing 52. Upper and lower reinforcement rings 58 and 60 respectively are incorporated within the packing 56 at its inner corners to prevent extrusion of the packing 56 into the clearance space 62 formed between the shaft 50 and housing 52.

FIG. 8 shows an arrangement whereby the packing 64 is received within an annular recess 66 formed on the shaft 50. Again reinforcing rings 68 and 70 are positioned at upper and lower outer corners respectively of the packing seal 64 to prevent extrusion of the packing into the clearance space 72 formed between the shaft 50 and housing 52.

The anti-extrusion rings or sections employed in the seals and packings of the present invention are comprised of a spring element or elements which are usually metallic in nature. The outer spring is constructed of an overlapping helical flat wire spring which forms an enclosed structure. The flat outer spring can be construced of various metals such as stainless steel, inconel, brass, etc. or may be made from various plastic-like materials that would meet the anti-extrusion qualifications of the structure. The inner coil spring may also be constructed of various materials, such as one of those listed above.

The materials used in forming the body section and/or sealing lips when such are present, can comprise a thermoplastic material, a thermosetting material, a fabric reinforced thermosetting material, a fabric reinforced thermoplastic material, a mixed thermoplastic/-theremosetting material or various combinations of the above. The term "thermosetting", as used herein, applies to those resins, generally synthetic in nature, which solidify or set on heating and can not be remelted. Non-limiting examples of such thermosetting resins include phenolics, alkyds, amino resins, polyesters, epoxies, silicones and the like. The term "thermoplastic", as used herein, applies to resins, generally synthetic in nature, that may soften by heat and then regain their original properties upon cooling. Non-limiting examples of such thermoplastic materials include nylon, polyethylene, polypropylene, cellulose and acrylic resins, polycarbonates and the like. As noted, the seals and packings can comprise a thermosetting or thermoplastic material reinforced with a fibrous material which can be in the form of a cloth or as a chopped or flocked filler. The term "fabric or fibrous material", as used herein, refers to any material obtained by weaving or other such techniques wherein the matrix consists of a lattice work or web of thread-like elements. Numerous materials fall into this class such as for example, cotton, asbestos, fiberglass, nylon, polyesters, linen, rayon and the like. Furthermore, blends of various materials such as cotton-polyester fabrics, rayon-polyester fabrics, etc. may be employed. It will also be apparent that the body section and the sealing lips, if present, can be formed of the same or different materials. It is typical, for example, to form both the body section and sealing lips of a homogeneous, relatively soft, resilient material such as natural or synthetic rubber or some other such natural or synthetic polymer.

While the description given above and as depicted in the drawings, the seals or packings have been described with particular reference to annular members such as D or U-ring packings, cup packings, etc. or to strip packing members, it is to be understood that the invention is not so limited. Thus, it is not necessary that the generally non-metallic body section be annular in configuration. Depending on the type of usage to which the seal or packing is put, the non-metallic body section can have virtually any configuration. For example, the body section can be elliptical, square, hexagonal or virtually any other shape. Whatever its shape, the body section would be provided with an anti-extrusion section or sections disposed on the non-metallic body section at points or areas subject to high extrusion forces. In general, and except in the case of an elongate strip type packing member, the sealing device, i.e., seal, packing, gasket, etc., will generally have an opening or passageway therethrough which usually is at least partially defined by at least a portion of the body section, sealing being effected in the region generally contiguous and surrounding the opening. Thus, a sealing device having a non-annular configuration could be used as a seal between the plug or cock and the body of a plug valve to ensure that when the valve was either in the open or closed position there was no fluid leakage from the flow passage into the body of the valve in which the plug is mounted. In static applications, the sealing device could have a highly assymetrical configuration as for example in a gasket which had a first, relatively large generally solid body section attached to a second lesser volume body section which defined an opening, the opening in the gasket registering with similar openings in removably fixed parts so as to ensure sealing between the parts at this juncture. The anti-extrusion section(s) would be suitably disposed in such a gasket to withstand imposed extrusion forces.

It will be understood that the various configurations and the materials of construction of the seals and packings disclosed herein are virtually endless. Accordingly, the configurations and materials of construction depicted and discussed above are merely illustrative and are not intended in any way to limit the scope of the invention either with regard as to the type of seal or packing or to the type of construction employed.

I claim:

1. A packing comprising:
   an extrudable body member having at least one sealing surface thereon; and
   anti-extrusion means incorporated in said body member to form a reinforced portion of said body member; said anti-extrusion means serving to resist extrusion forces acting on said body member in the area contiguous to said reinforced portion, said anti-extrusion means being comprised of a flat helical spring with adjacent helical spring segments overlapping to form a tubular shell.

2. The packing of claim 1 wherein said anti-extrusion means is bonded to said body member.

3. The packing of claim 1 wherein said helical spring is formed from a metallic substance.

4. The packing of claim 1 wherein said body member is formed of an elastomeric material.

5. The packing of claim 1 and further including a round wire helical spring positioned within said tubular shell.

6. The packing of claim 1 wherein there are a plurality of reinforced portions having anti-extrusion means incorporated therein.

* * * * *